United States Patent
Bärenreuter et al.

(10) Patent No.: US 11,592,105 B2
(45) Date of Patent: Feb. 28, 2023

(54) SCRAPER RING FOR A THREE-PART OIL SCRAPER RING AND THREE-PART OIL SCRAPER RING

(71) Applicant: FEDERAL-MOGUL BURSCHEID GMBH, Burscheid (DE)

(72) Inventors: Dirk Bärenreuter, Odenthal (DE); Jürgen Gillen, Leverkusen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 17/268,211

(22) PCT Filed: Jul. 18, 2019

(86) PCT No.: PCT/EP2019/069314
§ 371 (c)(1),
(2) Date: Feb. 12, 2021

(87) PCT Pub. No.: WO2020/035253
PCT Pub. Date: Feb. 20, 2020

(65) Prior Publication Data
US 2021/0180695 A1   Jun. 17, 2021

(30) Foreign Application Priority Data
Aug. 13, 2018 (DE) .................. 10 2018 119 586.9

(51) Int. Cl.
*F16J 9/06* (2006.01)
*F16J 9/20* (2006.01)
(52) U.S. Cl.
CPC ............ *F16J 9/064* (2013.01); *F16J 9/20* (2013.01)

(58) Field of Classification Search
CPC ........ F16J 9/06; F16J 9/064; F16J 9/20; F16J 9/203; F02F 5/00
See application file for complete search history.

(56) References Cited

U.S. PATENT DOCUMENTS

RE23,014 E  *  7/1948  Bramberry ................ F16J 9/26
                                                                     277/443
2,712,971 A       7/1955  Phillips
(Continued)

FOREIGN PATENT DOCUMENTS

DE           3833322 A1    12/1989
DE      112015001071 T5    12/2016
(Continued)

OTHER PUBLICATIONS

Machine translation of JP H08-159282 A, Nichima, originally published Jun. 21, 1996, obtained from https://worldwide.espacenet.com/, pp. 1-5. (Year: 1996).*

*Primary Examiner* — Grant Moubry
(74) *Attorney, Agent, or Firm* — Robert L. Stearns; Dickinson Wright, PLLC (57) ABSTRACT

A three-part oil scraper ring includes an expander spring and two scraper rings, comprising a ring body (4) having an upper flank (6), a lower flank (8), a ring inner surface (10) and a ring outer surface (12) which has a ring outer contour (14) in cross-section in axial direction (A). The ring body (4) has a height H which corresponds to the greatest distance of the upper flank (6) to the lower flank (8). The ring outer contour (14) forms a running surface (16) which has a radius of curvature R which is smaller than the height H of the scraper ring (2) by a factor between 1.5 to 6, preferably between 3 to 5 and further preferably between 3.5 to 4.5.

8 Claims, 6 Drawing Sheets

(56) References Cited

U.S. PATENT DOCUMENTS

| | | | | |
|---|---|---|---|---|
| 7,036,823 B2* | 5/2006 | Takiguchi | ................ | F16J 9/064 |
| | | | | 277/434 |
| 9,791,045 B2* | 10/2017 | Fukuma | ................... | F16J 9/064 |
| 2015/0184748 A1* | 7/2015 | Sytsma | ..................... | F16J 9/06 |
| | | | | 277/310 |
| 2015/0240943 A1* | 8/2015 | Meacham | ................ | F02F 3/00 |
| | | | | 29/888.041 |
| 2015/0292620 A1* | 10/2015 | Mittler | ...................... | F16J 9/20 |
| | | | | 277/434 |
| 2016/0076649 A1 | 3/2016 | Fukuma et al. | | |
| 2017/0184198 A1 | 6/2017 | Kawase et al. | | |

FOREIGN PATENT DOCUMENTS

| | | |
|---|---|---|
| EP | 3270012 A1 | 1/2018 |
| JP | S5962358 U | 4/1984 |
| JP | H08-159282 A | 6/1996 |
| JP | 6251850 B1 | 12/2017 |
| WO | 2016038916 A1 | 4/2017 |

* cited by examiner

SCRAPER RING FOR A THREE-PART OIL SCRAPER RING AND THREE-PART OIL SCRAPER RING

BACKGROUND

1. Technical Field

The present invention relates to a rail or a scraper ring for a three-part oil scraper ring as well as an oil scraper ring having such a rail.

2. Related Art

Oil scraper rings have been known for a fairly long time, wherein various designs are used. For example, one-part oil scraper rings with two scraper webs and radial openings in the ring between the scraper webs are known. One-part oil scraper rings are also frequently used together with expander springs in order to achieve the most uniform possible contact force over the entire circumference and therefore also the most uniform possible scraping effect. So-called three-part oil scraper rings are also known in which two substantially disk-shaped or flat scraper rings or rails are held at a distance in the axial direction by a spring in order to be pressed outwards in the radial direction.

Oil scraper rings in various designs are already known from the patent documents US 2016/0076649 A1, US2017/0184198 A1, EP3270012 A1, DE112015001071 T5 and JP H08-159282 A, DE 3833322 A1, U.S. Pat. No. 2,712,971 A, JP WO2016038916 A1, JP S59 62358 U and JP 6251850B1.

There are many parameters on an oil scraper ring which influence the scraping properties.

In order to improve the scraping behaviour, it is inter alia necessary to convey the oil in the direction of the groove base of the oil scraper piston ring. This aspect has only been taken into account so far by various slots and openings between the usually two scraper webs of an oil scraper ring.

SUMMARY

It is desirable to further improve the scraping properties of oil scraper rings.

A three-part oil scraper ring comprises two ring bodies having an upper flank, a lower flank, a ring inner surface and an expander spring. The upper flank or scraper ring flank should in this case abut against a piston ring groove flank or against a spring of a three-part oil scraper ring in each case in the axial direction. The lower flank or scraper ring flank should in this case abut against a piston ring groove flank or against a spring of a three-part oil scraper ring in each case in the axial direction. The ring inner surface is to this end intended to abut against a spring or an expander of a three-part oil scraper ring in the radial direction.

The ring outer surface has a ring outer contour in a cross-section in axial direction which should run through the axis of rotational symmetry.

The ring body has a height H in the axial direction which corresponds to the greatest distance of the upper flank surface from the lower flank surface in the axial direction.

The ring outer contour forms a running surface, wherein the ring outer contour has a radius of curvature R which is smaller than the height H of the scraper ring by a factor between 1.5 to 6, preferably between 3 to 5 times and further preferably between 3.5 to 4.5.

Like all piston rings, scraper rings and oil scraper rings, the ring body also comprises a ring splice.

The scraper ring is in particular characterized in that in the region in which said ring is in contact with a cylinder inner surface, said ring has a significantly smaller radius of curvature than the half height of the respective scraper ring. This aspect of the present invention relates in particular only to the scraper ring of a three-part oil scraper ring.

In one exemplary embodiment, the scraper ring is symmetrical with respect to a plane which extends along the half height H of the scraper ring.

In an exemplary embodiment of the scraper ring, the height H of the scraper ring is between 0.28 mm and 0.52 mm, preferably between 0.34 mm and 0.46 mm and further preferably between 0.38 and 0.42 mm. Exemplary embodiments are also disclosed having a radius of curvature R of the running surface between 0.06 mm and 0.04 mm, preferably between 0.08 mm and 0.12 mm and further preferably between 0.09 mm and 0.11 mm.

In another exemplary embodiment of the scraper ring, the height H of the scraper ring is between 0.28 mm and 0.52 mm and the radius of curvature R of the running surface is between 0.06 mm and 0.04 mm. In a further exemplary embodiment of the scraper ring, the height H of the scraper ring is between 0.34 mm and 0.46 mm, the radius of curvature R of the running surface is 0.08 mm and 0.12 mm. In an additional exemplary embodiment of the scraper ring the height H of the scraper ring is between 0.38 and 0.42 mm and the radius of curvature R of the running surface is between 0.09 mm and 0.11 mm.

In another exemplary embodiment of the scraper ring, a radially outermost point of the ring outer contour of the running surface is located at the half height H/2 of the scraper ring. Here the scraper ring is configured so that it centrally contacts a cylinder inner surface when viewed in the axial direction. Here the scraper ring shows no tendency to twist.

In a further exemplary embodiment of the scraper ring, a transition is provided between the curvature having the radius of curvature R and the lower flank. The transition is here designed to be convex in cross-section and goes over continuously and smoothly into the curvature R. As a result, non-scraped oil which has passed through the gap between cylinder inner wall and the running surface having the radius R, adhering to the running surface of the scraper ring, should be deflected inwards in the direction of the groove base on the rear side of the curvature R. This functions particularly well at the upper scraper ring of a three-part oil scraper ring during an upward movement of the piston.

In a further exemplary embodiment of the oil scraper ring, a transition is provided between the curvature R and the upper flank, wherein the cross-section is designed to be convex and goes over continuously and smoothly into the curvature R. Here also, non-scraped oil which has passed through the gap between cylinder inner wall and the running surface having the radius R, adhering to the running surface, is deflected inwards in the direction of the groove base on the rear side of the curvature R. This functions particularly well at the lower scraper ring of a three-part oil scraper ring during a downward movement of the piston.

In an additional exemplary embodiment of the scraper ring, a transition between the curvature R and the lower flank has a transition radius of curvature Ru which is between once the height H and 40 times the height H, preferably between twice the height H and 20 times the height H and further preferably between four times the height H and ten times the height H. If the design is symmetrical, this design also relates to the transition between the curvature R and the upper flank. In this design, a smaller rounding radius can also exist between the transition region and the upper flank.

In another exemplary embodiment of the scraper ring, the ring outer surface extends in the radial direction over a region which accounts for ⅕ of the height H and ⅘ of the height H, preferably between ¼ of the height H and ¾ of the height H and further preferably between ⅓ of the height H and ½ of the height H. The width of a tapered region of the scraper ring on the outer side or running surface in this case does not extend as far as the ring is high.

In a further exemplary embodiment of the scraper ring, a transition between the curvature R and the lower flank is executed in cross-section as a spiral curve, preferably executed as a hyperbolic spiral curve. The spiral curve is preferably executed as convex in cross-section and goes over continuously and smoothly into the curvature R and into the flank surface. Here an improved deflection of oil in the direction of the groove base is expected since the gradual change of the radius of curvature in the spiral curve enables the oil flowing therealong to be better deflected in the direction of the groove base.

In a symmetrical design this also relates to the transition between the curvature R and the upper flank which then also follows a spiral curve.

In an additional exemplary embodiment of the scraper ring, the scraper ring is an upper scraper ring of a three-part piston ring.

According to a further aspect, an exemplary embodiment of a scraper ring is claimed wherein a radially outermost position of the ring outer contour of the running surface is located at the height of the scraper ring, which corresponds to the value R of the radius of curvature of the running surface and wherein preferably the radius R of the running surface goes over continuously and smoothly into the lower flank.

Here in cross-section, the radius of curvature goes over directly into the lower flank since the circle defined by the radius of curvature R lies tangentially to the lower flank (when viewed in cross-section).

In another exemplary embodiment of the scraper ring, in cross-section the upper flank at an outer edge goes over continuously and smoothly into the curvature Ro, which is smaller than the curvature R of the running surface, wherein the radii of curvature R and Ro are connected by a common tangent. The two radii of curvature and the tangents together form the ring outer surface. In the finished ring the tangent forms a truncated cone surface which tapers upwards. The upper and lower radius of curvature each form subsurfaces of tori.

In another exemplary embodiment of the scraper ring, in the cross-section the midpoints of the radii of curvature R and Ro lie on a straight line which is parallel to an axial direction of the scraper ring.

Thus, two pitch circles having the radii R and Ro are obtained which are interconnected by a tangent section. The pitch circles having the radii R and Ro overall have an angle of 180°. The pitch circle having the radius R extends over an angular range of more than 90°. The pitch circle having the radius R preferably extends over an angular range between 95° and 115°, preferably over an angular range between 98° and 110°, and further preferably over an angular range between 100° and 105°. The pitch circle having the radius Ro extends over an angular range of less than 90°. The pitch circle having the radius RO preferably extends over an angular range between 65° and 85°, preferably over an angular range between 70° and 82° and further preferably over an angular range between 75° and 80°.

In cross-section here the tangent section of the upper scraper ring is defined as the root of the sum of the square of the difference of the radii R and Ro and the square of the difference of the sum of the radii and the height H. $l = \sqrt{(R-Ro)^2 + [(H-(R+Ro)]^2}$ The angle of the cone surface produced by a rotation of the tangent section about an axial axis of the scraper ring is in this case between 5° and 25°, preferably over an angular range between 8° and 20° and further preferably over an angular range between 10° and 15°.

In this embodiment the upper ring flank goes over smoothly and continuously into the curvature Ro, which in turn goes over smoothly and continuously into the tangent section which in turn goes over smoothly and continuously into the curvature R of the running surface, which then finally goes over smoothly and continuously into the lower flank. The two radii of curvature and the tangent together form the ring outer surface. In the finished ring the tangent forms a truncated cone surface which tapers upwards.

In a further exemplary embodiment of the scraper ring, a radially outermost position of the ring outer contour of the running surface is located at the height R of the scraper ring measured from its lower ring flank and furthermore the transitions between the lower ring flank, the curvature R of the tangent section, the radius of curvature Ro and the upper flank are executed continuously and smoothly in each case. The radially outer surface is composed in cross-section of two circular arcs and a section, wherein no edges occur.

The ring outer surface preferably has an axial extension of R, the lower radius of curvature R of the running surface.

In another exemplary embodiment of the scraper ring, the scraper ring is an upper scraper ring of a three-part piston ring. Specifically the form of the scraper ring enables the scraper ring to float particularly well on an oil layer during a movement of the piston upwards.

According to a further aspect, an exemplary embodiment of a scraper ring is provided for a three-part oil scraper ring, wherein the radius of curvature has the value R which is smaller than the height H of the scraper ring by a factor between 1.5 to 4, preferably between 1.8 to 3 times and further preferably between 2 to 2.5. This embodiment relates to a scraper ring having a relatively large radius of curvature R.

In another exemplary embodiment of the scraper ring, the radius of curvature R is between 0.03 and 0.2 mm, preferably between 0.04 and 0.15 mm and further preferably between 0.05 and 0.10 mm, and a height H of the scraper ring is between 0.2 and 0.8 mm, preferably between 0.25 and 0.15 mm and further preferably between 0.3 and 0.5 mm.

In a further exemplary embodiment of the scraper ring, the radius of curvature R is between 0.03 and 0.2 mm, and a height H of the scraper ring is between 0.2 and 0.8 mm. In an additional exemplary embodiment of the scraper ring, the radius of curvature R is between 0.04 and 0.15 mm and a height H of the scraper ring is between 0.25 and 0.15 mm. In another exemplary embodiment of the scraper ring, the radius of curvature R is between 0.05 and 0.10 mm and a height H of the scraper ring is between 0.3 and 0.5 mm. These combinations are also considered to be particularly promising for a good scraper result.

In a further exemplary embodiment of the scraper ring, a radially outermost point of the ring outer contour of the running surface is located at between 55 and 80%, preferably between 50 and 75% and further preferably between 65 and 70% of the height H of the scraper ring. The scraper ring therefore presses at one point against the cylinder inner surface which lies above the centre of the scraper ring. This brings about a twisting of the scraper ring.

In an additional exemplary embodiment of the scraper ring, respectively one lower and one upper transition is provided between the curvature R and the lower flank or the upper flank which in cross-section each form tangents at the curvature R and which each extend in relation to a radial plane at an angle between 30° and 75° in the direction of the upper or lower flank.

The transitions are designed to be substantially straight, wherein one corner or edge can also be rounded between the upper or lower transition. The ring outer surface is formed here substantially by a circular arc and two tangential sections which can be designated as upper or lower transition tangents.

In a further exemplary embodiment of the scraper ring, the positions at which the upper or lower transition each go over into the upper or lower flank lie above one another in the axial direction or have the same radial distance from the axial axis of symmetry.

In another exemplary embodiment of the scraper ring, respectively one lower and one upper spiral transition is provided between the radius of curvature R and the lower flank or the upper flank of the lower scraper ring, wherein the spiral transitions in each case go over smoothly and continuously into the curvature R or the upper/lower flank. This embodiment enables a more uniform transition between the curvature of the running surface and the piston ring flanks than would be possible with straight sections.

Straight spiral transitions can enable an improved flow of the scraped-off oil in the direction of the piston ring groove base. A spiral transition here relates to a section in the axial direction. A spiral transition is in this case executed as a spiral curve, preferably as a hyperbolic spiral curve. The transitions are designed to be convex and preferably go over continuously and smoothly into the radius of curvature R and into the flank surfaces.

In an additional exemplary embodiment of the scraper ring, the scraper ring is a lower scraper ring of a three-part piston ring. In an additional exemplary embodiment of the scraper ring, the scraper ring is an upper scraper ring of a three-part piston ring. In an additional exemplary embodiment of the scraper ring, the scraper ring is a lower and an upper scraper ring of a three-part piston ring, wherein this scraper ring can be used at both positions.

According to a further aspect, an exemplary embodiment of a three-part oil scraper ring is provided, wherein in each case an upper scraper ring and a lower scraper ring are used, such as are described previously, wherein the scraper rings are held at a distance by an expander spring and are pressed radially outwards.

In an exemplary embodiment of the three-part oil scraper ring, in each case the same oil scraper rings as described previously were used.

In a further exemplary embodiment of the three-part oil scraper ring, an upper scraper ring having two radii of curvature and the interposed tangential section as described previously is used whereas a lower scraper ring having one radius of curvature and two straight or spiral transitions as described previously is used. Here it is noticeable that both rings each twist in opposite directions. In addition, in this embodiment the contact points or lines of the scraper rings lie closer together than a spacing of the respective central planes of the scraper rings.

In a further exemplary embodiment of the three-part oil scraper ring, the expander spring is executed as an MF spring. Specifically MF expander springs allow a particularly good oil passage in the radial direction since the MF expander springs only cover a small part of the gap between the upper and the lower oil scraper ring compared to SS50 and MD expander springs.

THE DRAWINGS

The present invention is described hereinafter with reference to diagrams of preferred embodiments.

DETAILED DESCRIPTION

The diagrams are schematic and not to scale. Both in the description and also in the figures the same or similar reference numbers are used to refer to the same or similar components or elements.

Figure 1:
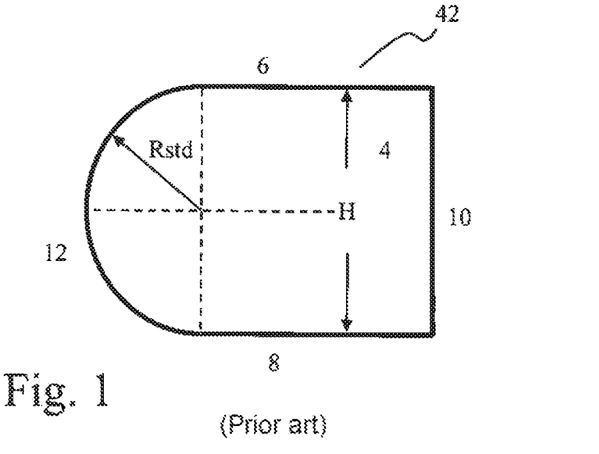
FIG. 1 shows a conventional scraper ring in a sectional view.

FIG. 1 shows a conventional scraper ring 42 in a sectional view. The scraper ring comprises a ring body 4 which is delimited at the top by an upper flank or flank surface 6 and at the bottom by a lower flank surface 8. The outer contour of the ring has a uniform radius of curvature $R_{sdt}$. The radius of curvature forms the running surface 12 of the scraper ring. The distance of the upper and lower flank surfaces in this case defines the height H of the scraper ring. The uniform radius of curvature $R_{sdt}$ is in this case exactly half the height H of the scraper ring. The scraper properties of this ring can be influenced by a variation of the height of the ring and of the material and primarily of the radial thickness and the properties of an expander spring used. The scraper rings according to the prior art have a fundamentally semi-circular corresponding external radius $R_{sdt}$ directed towards the cylinder inner surface, which corresponds to half the height.

Figure 2:
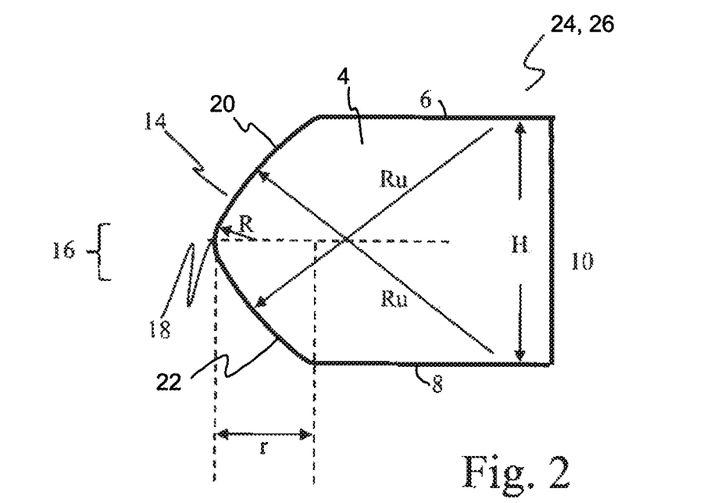
FIG. 2 shows first embodiment of a scraper ring according to the invention in a sectional view.

FIG. 2 shows a first embodiment of a scraper ring according to the invention in a sectional view. The scraper ring 26 comprises a ring body 4 which is delimited at the top by an upper flank or flank surface 6 and at the bottom by a lower flank surface 8. The height H is here also defined as the distance between the flank surfaces. The ring outer side 12 comprises a ring outer contour 14 in cross-section along the axial direction and through the axial axis of symmetry. The ring outer contour 14 forms a running surface 16 which has a radius of curvature R which is significantly smaller than the height H. The radius of curvature is smaller than the height H of the scraper ring 26 by a factor between 3.5 to 4.5. The curvature with the radius R of the running surface 16 goes over continuously and smoothly into the transition 20 between the curvature R and the upper flank and the transition 22 between the curvature R and the lower flank. The respective radii of curvature of the transitions 20 and 22 can be much greater than the height H. It is also provided to round the edges which can occur between the transitions 20 and 22 and the flanks 6, 8. Overall the ring outer surface is formed as a combination of three radii, the radius of curvature R of the running surface, which go over at the top/bottom into the transitions 20, 22 with the transition radii of curvature R. The radially outermost position or pivot point 18 of the ring outer contour of the running surface 16 forms the contact point of the ring outer contour 14. In the finished scraper ring 2 the contact point then forms a contact line. The running surface contour is optimized for a reduced oil consumption.

In the depicted scraper ring the region which is intended to abut against the cylinder inner wall has a significantly smaller radius of curvature than in scraper rings of the prior art. The radius of curvature R should here lie in the range from 0.08 to 0.12 mm. The transition regions 20 and 22 are preferably 0.75 mm. The distance r which describe the radial extension of the ring outer surface 12 is between 0.1 to 0.2 mm, and should be 0.15 mm in FIG. 2. The outer contour of the scraper ring is mirror-symmetrical with respect to a plane which runs at half height H through the scraper ring. The new ring outer contour showed advantages with regard to the oil consumption both in the simulation and also under usage conditions.

Figure 3:
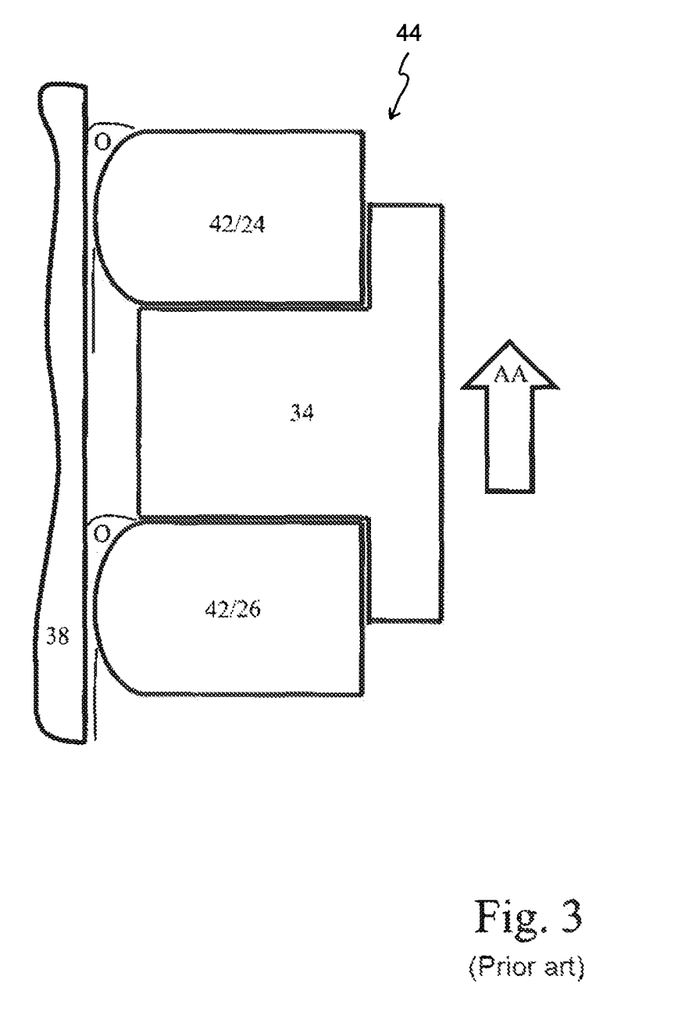
FIG. 3 shows a conventional three-part oil scraper ring in a sectional view.

FIG. 3 shows a conventional three-part oil scraper ring 44 in a sectional view. The conventional oil scraper ring 44 comprises an upper scraper ring 42 and a lower scraper ring 42. Both scraper rings are designed as conventional scraper rings 42. Both conventional scraper rings 42 are pressed outwards towards a cylinder inner wall 38 by an expander spring 34. The expander spring 34 also ensures that the two conventional scraper rings 42 maintain a sufficient distance in the axial direction. So far, there are three-part oil scraper rings on the market which use various scraper rings, but so far rings which have the same outer contour, i.e. which both have the same radius of curvature, are used as upper scraper ring and as lower scraper ring. Both scraper rings scrape oil on the inner side of the cylinder 38 in the same way. Here the scraping process is shown in an upwards movement AA. Since the scraper ring is designed symmetrically, the diagram corresponds to the situation in a downwards movement, that is, precisely that which should occur in an upwards movement.

The aim is to achieve an improved oil scraping effect and/or a minimum of the friction losses compared to a conventional oil scraper ring with identical upper and lower scraper rings. A further important aspect consists in avoiding or at least significantly reducing the formation and deposition of oil coke in the area of an expander spring. Furthermore, it is desirable to achieve the friction produced by an oil scraper ring without significant adverse effects on the oil consumption.

Figure 4:
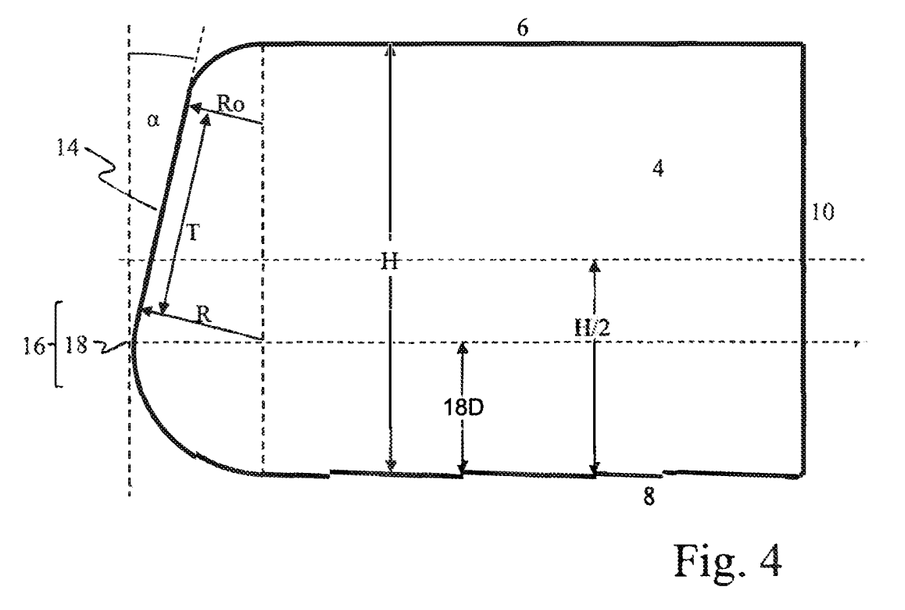
FIG. 4 shows a second embodiment of a scraper ring according to the invention in a sectional view.

FIG. 4 shows a second embodiment of a scraper ring according to the invention in a sectional view. In contrast to the scraper ring from FIG. 1, the ring from FIG. 4 is not symmetrical with respect to a plane which extends at half the height H through the piston ring. FIG. 4 shows a cross-sectional view through the scraper ring 2 with the ring body 4 which is delimited at the top by an upper flank or flank surface 6 and at the bottom by a lower flank surface 8. On the inner side the ring body is delimited by a ring inner surface 10. The ring inner surface 10 lies opposite the ring outer side 12. The ring outer side 12 forms the ring outer contour 14. On the ring outer contour 14 the curvature with the radius R forms a running surface 16. The curvature with the radius R goes over continuously and smoothly into the lower flank surface 8, or the lower flank surface 8 forms a tangent to the curvature with the radius R. The curvature extends over more than 90° so that the radially outermost position or pivot point 18 of the ring outer contour of the running surface 16 is formed by the curvature with the radius R. The pivot point 18 is located in this case at a distance 18D above the lower scraper ring flank 8. The curvature with the radius R then goes over directly continuously and smoothly into a straight section via which a truncated cone lateral surface is formed at the scraper ring. The tangential section in turn goes over into an upper radius of curvature Ro which is tangential both to the tangential section and also to the line of intersection of the upper flank. The radius Ro is in this case smaller than the radius R. The tangential section is here a common tangent T to the radii R and Ro. In the embodiment, the midpoints of the radii R and Ro lie precisely above one another in the axial direction so that the truncated cone lateral surface converges upwards.

The pivot point 18 of the asymmetrically conical rail or scraper ring is offset in the direction of the lower flank. Said pivot point lies at 20 to 40% of the axial height H. Thus, the value of the radius of curvature R corresponds to a fifth to two and a half times the height H. The axial height of the upper scraper ring remains in the range of 0.3 to 0.5 mm. Furthermore, the outer contour of the scraper ring is determined by the dimensions of the curvature having the radius R and the angle α. The angle α is the cone angle of the truncated cone surface or the angle of the common tangent of the radii R and Ro to the axial direction. The radius will here be between 0.15 and 0.25 mm and the angle α between 5 and 20°. The radius Ro can be between 0.1 and 0.2 mm. This scraper ring should be used as upper scraper ring.

Figure 5:
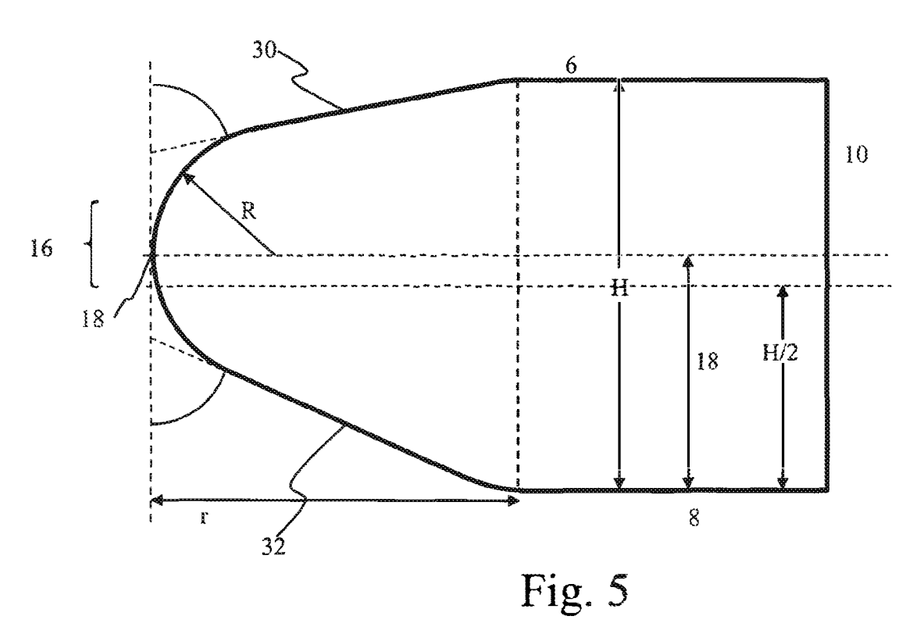
FIG. 5 shows a third embodiment of a scraper ring according to the invention in a sectional view.

FIG. 5 shows a third embodiment of a scraper ring according to the invention in a sectional view. Here a scraper ring with a running surface 16 is provided which is designed to be symmetrically spherical in the region of the pivot point 18. However, the pivot point is located above a central plane H/2. When viewed from the lower flank, the pivot point 18 is located at an axial height between 55 and 75% of the height H. The radius R which defines the convexity of the running surface can lie in the range between 0.05 and 0.15 mm. The curvature having the radius R goes upwards and downwards in each case tangentially into the upper transition tangent 30 and the lower transition tangent 32. The transition tangents can in this case have angles between 30° and 75° to the axial direction. The transition tangents 30 and 32 go over with a bend into the upper or lower flank which can be rounded. The contour of the scraper ring suggests a reduced friction.

Figure 6:
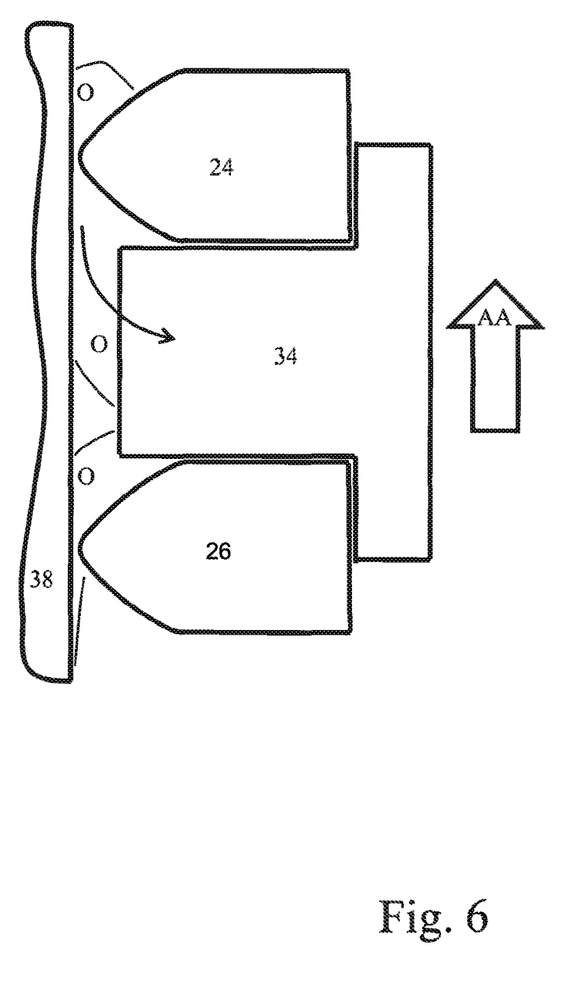
FIG. 6 shows a three-part oil scraper ring with scraper rings according to the invention in a sectional view.

FIG. 6 shows a three-part oil scraper ring with scraper rings according to the invention in a sectional view. The three-part oil scraper ring comprises an upper scraper ring 24 which is executed according to the embodiment of FIG. 4. The three-part oil scraper ring comprises a lower scraper ring 26 which is executed according to the embodiment of FIG. 5. This oil scraper ring according to the invention firstly uses two identical scraper rings with two identical scraper ring contours in an oil scraper ring. The upper scraper ring 24 and the lower scraper ring 26 are pressed radially outwards towards a cylinder inner surface 38 by an expander spring 34 which is executed as an MF meander spring. The MF meander spring 34 maintains a defined axial distance between upper scraper ring 24 and the lower scraper ring 26. In FIG. 6 the oil scraper ring moves upwards in the axial direction as indicated by the arrow AA.

The upper scraper ring 24 produces an "oil catching effect" as a result of the partially conical running surface 16 in which the upper scraper ring 24 floats on the oil and the oil passes between the scraper rings 24, 26. As a result of the transition region, the upper scraper ring 24 can prevent the oil from accumulating in front of the scraper ring and collecting at the top between the upper scraper ring flank 6 and an upper piston ring groove flank. The scraper ring located at the bottom having a symmetrically spherical running surface prevents the oil O from leaving the ring intermediate space downwards.

In this embodiment oil is transported continuously between the upper scraper ring 24 and the lower scraper ring 26 and through the MF expander spring which should prevent any coking of the spring.

Figure 7:
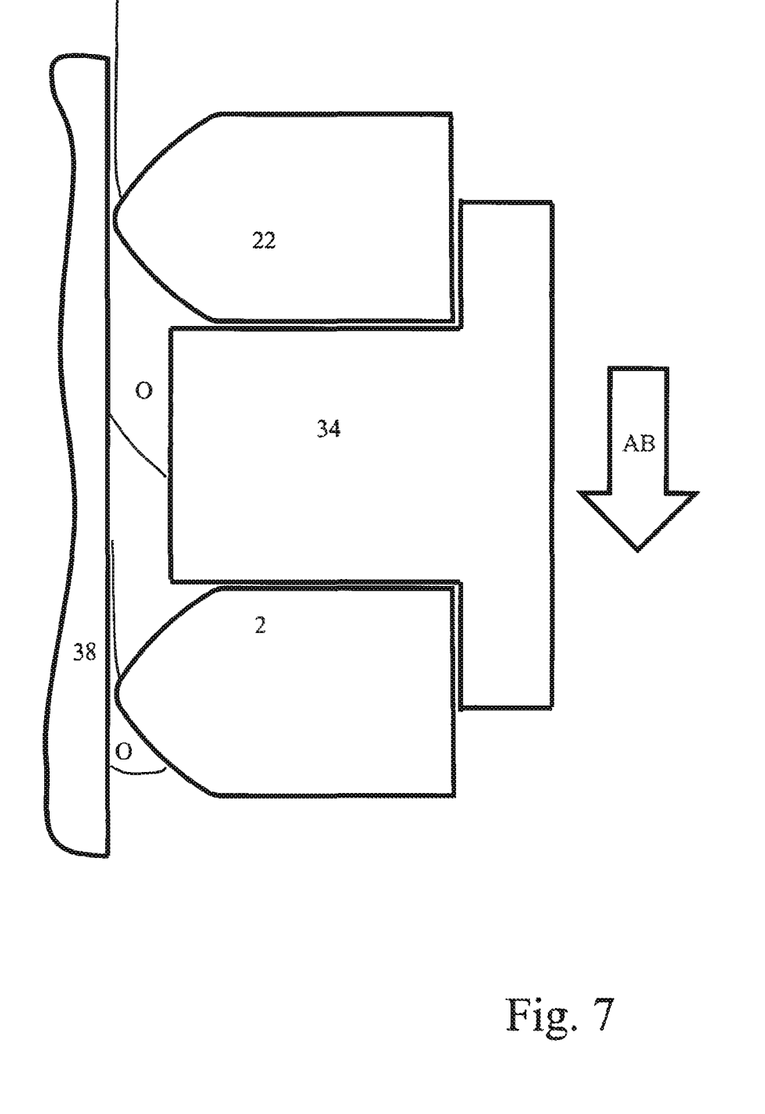
FIG. 7 shows a three-part oil scraper ring with scraper rings according to the invention in a sectional view.

FIG. 7 shows a three-part oil scraper ring from FIG. 6 during a movement in the axial direction downwards as indicated by the arrow AB.

As a result of the running surface 16, the upper scraper ring produces a thin oil film since the upper scraper ring 24 does not float on the oil film and pushes most of the oil O in front of it. Due to oil layers of different thickness, the upper scraper ring has a greater scraping power than the lower scraper ring 26. The difference of the scraping powers is led off between the upper scraper ring and the lower scraper ring in the direction of the groove base (not shown).

Figure 8:
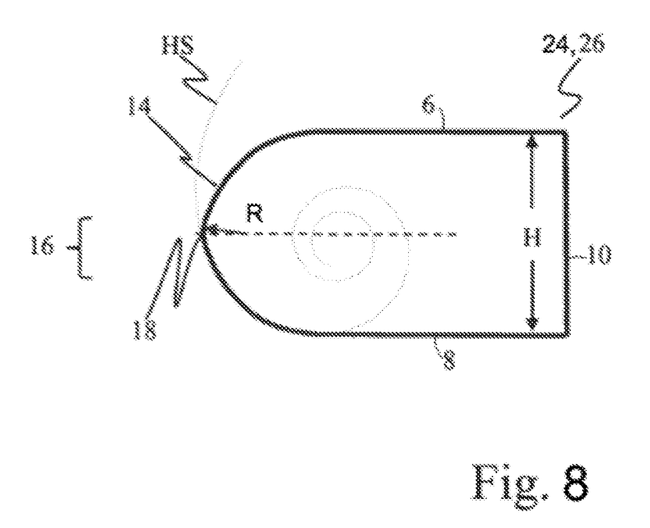
FIG. 8 shows an embodiment of a scraper ring in a sectional view.

FIG. 8 shows a further embodiment of a scraper ring 24, 26 which is similar to the scraper ring shown in FIG. 2 and with the same reference numerals used to indicate the same or like features except where noted. In this embodiment, the upper and lower transition surface 20, 22 each follow the curvature of a spiral and more particularly a hyperbolic spiral. The trace of the hyperbolic spiral forming the lower transition surface 22 is designated at HS, with it being understood that to hyperbolic spiral path in the opposite direction forms the upper transition surface 20. Each transition surface 20, 22 goes over smoothly and continuously into curvature formed by the radius R and into the upper 6 and lower 8 flanks, respectively.

In principle here in a three-part oil scraper ring an upper and lower scraper ring having a symmetrically spherical running surface is used. As a result of this arrangement, the lubricating oil is collected on the cylinder running surface in the upward stroke and collected as a result of the "oil catching effect" between the upper scraper ring and the lower scraper ring and led off in the direction of the piston ring groove base. The scraped oil can pass back into the crankcase through corresponding channels in the piston. The principle is based on a scraping power of the upper scraper ring 24 whose scraping power lies above that of the lower scraper ring during a downward movement. This is achieved as a result of the fact that more oil can be scraped off from a thicker oil layer. The scraping power of the upper scraper ring is in this case preferably reduced below that of the lower scraper ring. This has the result that even during an upward movement more oil is scraped by the "rear" scraper ring in the direction of movement. Overall both during an upward movement AA and also during a downward movement oil is captured between the scraper rings 24, 26 and transported in the direction of the groove base and further into the crankcase.

Both scraper rings according to FIG. 2 or FIG. 8 are used.

The invention claimed is:

1. A three-part oil scraper ring, comprising an upper scraper ring and a lower scraper ring, wherein the scraper rings are held at a distance by an expander spring and pressed radially outwards,
  wherein each of the upper and the lower scraper rings comprise:
a ring body having an upper flank, a lower flank, a ring inner surface and a ring outer surface which has a ring outer contour in cross-section in an axial direction, wherein the ring body has a height H which, when viewed in the axial direction, corresponds to the greatest distance of the upper flank to the lower flank, wherein the ring outer contour includes a running surface which has a radius of curvature R which is smaller than the height H of the respective ring body by a factor between 1.5 to 6, wherein the scraper ring is symmetrical with respect to a plane which extends along the height H of the respective ring body, wherein a radially outermost position of the ring outer contour of the running surface is located at half the height H/2 of the respective ring body,
  wherein the ring outer contour includes an upper transition surface and a lower transition surface extending between the radius of curvature R and the upper and lower,
  wherein the upper and lower transition surfaces each have a cross section that extends continuously and smoothly into the radius of curvature along a hyperbolic spiral curve and
  wherein the expander spring comprises an MF spring.

2. The three-part scraper ring according to claim 1, wherein the factor is between 3 to 5.

3. The three-part scraper ring according to claim 1, wherein the factor is between 3.5 to 4.5.

4. The three-part oil scraper ring according to claim 1, wherein the height H of the ring body of each of the lower and upper scraper rings is between 0.28 mm and 0.52 mm and wherein the radius of curvature R of the running surface is between 0.06 mm and 0.04 mm.

5. The three-part scraper ring according to claim 4, wherein the height H of the ring body of each of the lower and upper scraper rings is between 0.34 mm and 0.46 mm.

6. The three-part scraper ring according to claim 4, wherein the height H of the ring body of each of the lower and upper scraper rings is between 0.38 mm and 0.42 mm.

7. The three-part scraper ring according to claim 4, wherein the radius of curvature R of the running surface is between 0.08 mm and 0.12 mm.

8. The three-part scraper ring according to claim 4, wherein the radius of curvature R of the running surface is between 0.09 mm and 0.11 mm.

\* \* \* \* \*